(12) United States Patent
Gupta et al.

(10) Patent No.: US 8,645,873 B2
(45) Date of Patent: Feb. 4, 2014

(54) METHODS AND SYSTEMS FOR MANAGING AN E-READER INTERFACE

(75) Inventors: Manisha Gupta, Uttar Pradesh (IN); Raju T. Ramakrishnan, Bangalore (IN); Balamurugan Natarajan, Coimbatore (IN); Peter Joseph, Kerala (IN); Soumya Tiwari, Chattisgarh (IN); James Y. Hwang, Dallas, TX (US); Ashish Phutela, Haryana (IN); Manidipa Bhattacharyya, Assam (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 271 days.

(21) Appl. No.: 13/041,229

(22) Filed: Mar. 4, 2011

(65) Prior Publication Data

US 2012/0227001 A1 Sep. 6, 2012

(51) Int. Cl.
*G06F 3/048* (2013.01)

(52) U.S. Cl.
USPC .......................................... 715/863

(58) Field of Classification Search
USPC ................................. 715/763, 722
See application file for complete search history.

(56) References Cited

U.S. PATENT DOCUMENTS

| 2008/0122796 A1* | 5/2008 | Jobs et al. ...................... 345/173 |
| 2009/0266888 A1* | 10/2009 | McCarthy ...................... 235/385 |
| 2011/0225549 A1* | 9/2011 | Kim .............................. 715/838 |
| 2012/0066581 A1* | 3/2012 | Spalink ........................ 715/232 |
| 2012/0204086 A1* | 8/2012 | Stoner et al. .................. 715/201 |
| 2012/0311438 A1* | 12/2012 | Cranfill et al. ................ 715/256 |

* cited by examiner

*Primary Examiner* — William Bashore
*Assistant Examiner* — Rayeez Chowdhury

(57) ABSTRACT

Exemplary methods and systems for managing an e-reader interface are disclosed herein. An exemplary method includes an e-reader interface management system directing an e-reader device to display a plurality of graphical objects representative of a plurality of segments of an e-publication and arranged in a plurality of overlapping rows, detecting that a user has accessed a particular segment within the plurality of segments and represented by a particular graphical object within the plurality of graphical objects, and dynamically altering at least one display attribute associated with the particular graphical object to indicate that the particular segment has been accessed by the user. Corresponding methods and systems are also disclosed.

20 Claims, 10 Drawing Sheets

METHODS AND SYSTEMS FOR MANAGING AN E-READER INTERFACE

BACKGROUND INFORMATION

The advent of e-publications and e-reader devices has allowed for the convenient distribution and access of literature in electronic format. For example, publishers are able to disseminate e-publications without the overhead costs typically associated with producing and distributing printed publications. Similarly, users are able to conveniently store, access, and/or transport vast libraries of publications by way of a single e-reader device that can fit in the user's bag or pocket.

In some instances, e-reader devices present one or more user interfaces to facilitate a user's access to and/or experience of one or more e-publications. Unfortunately, however, traditional e-reader interfaces can be rigid and unintuitive as well as lack options for customization or personalization. For example, many traditional e-reader interfaces have a grid-like format that limits what is displayed, how it is displayed, where it is displayed, and how e-publication content is discovered, navigated, and accessed by a user. As a result, the process of browsing traditional e-reader interfaces and accessing corresponding e-publication content may seem constricted, unintuitive, and otherwise unappealing for users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Figure 1:
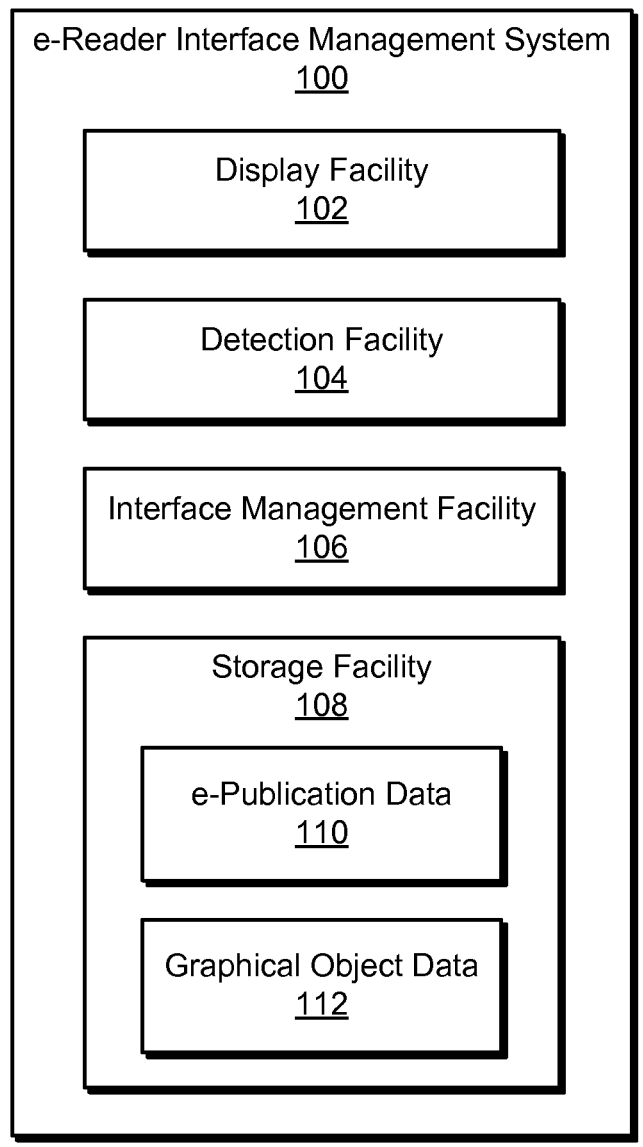
FIG. 1 illustrates an exemplary e-reader interface management system according to principles described herein.

Exemplary methods and systems for managing an e-reader interface are disclosed herein. As described in more detail below, in an exemplary method, an e-reader interface management system may direct an e-reader device to display a plurality of graphical objects representative of a plurality of segments of an e-publication and arranged in a plurality of overlapping rows, detect that a user has accessed a particular segment within the plurality of segments and represented by a particular graphical object within the plurality of graphical objects, and dynamically alter, in response to the detecting, at least one display attribute associated with the particular graphical object to indicate that the particular segment has been accessed by the user. Additional exemplary methods and/or systems are also disclosed herein.

As will be explained in more detail below, the exemplary methods and systems disclosed herein may provide, manage, and/or control one or more e-reader interfaces. In some examples, the methods and systems disclosed herein may be configured to provide a customized e-reader interface to a user by way of which e-publication content is made available to the user in a unique, personalized, and/or intuitive manner in accordance with the user's unique user profile, preferences, interactions, and/or desires. Additionally or alternatively, the methods and systems disclosed herein may be self-learning over time and may be configured to dynamically adjust a user's e-publication experience in accordance with the user's changing preferences, traits, and/or moods. Accordingly, the methods and systems disclosed herein may enhance a user's experience of a corresponding e-publication. Additional benefits and/or advantages will be apparent from the details disclosed herein.

As used herein, the term "e-reader interface" may refer generally to any user interface configured to allow a user to browse, discover, access, and/or experience e-publication content by way of an e-reader device. In some examples, an e-reader interface may be displayed by an e-reader device (e.g., on a display screen associated with the e-reader device).

As used herein, the terms "e-reader device" and "e-reader" may refer to any suitable computing device configured to access, read, and/or display an e-publication for experiencing (e.g., reading, viewing, etc.) by a user. In some examples, an e-reader may include a computing device (e.g., a mobile phone device, a tablet computer, a personal-digital assistant device, a handheld device, a laptop computer, a personal computer, etc.) implementing one or more software applications that allow the computing device to access, read, and/or display e-publications. In additional or alternative examples, an e-reader may be a "dedicated e-reader" (e.g., a Kindle, a Nook, etc.) that is configured to be used primarily as an e-reader device.

As used herein, the term "e-publication" may refer to any publication published in electronic/digital form. For example, an e-publication may include the electronic form of a magazine (e.g., an e-magazine), a book (e.g., an e-Book), a newspaper, any other suitable publication, and/or any portion thereof. An e-publication may include text, one or more images (e.g., photographs, illustrations, graphs, tables, etc.), and/or any other suitable e-publication content. In some examples, an e-publication may be the digital equivalent of a corresponding printed publication. An e-publication may be published in accordance with any suitable e-publication formats and/or technologies. In some examples, an e-publication may be published in accordance with a proprietary e-publication format (e.g., in accordance with one or more digital rights management technologies).

In some examples, an e-publication may include one or more segments. As used herein, the terms "segment" and "e-publication segment" may refer to any distinct portion of an e-publication. For example, an e-publication segment may include a chapter from an e-Book, an article from an e-magazine or newspaper, and/or any other suitable segment of a corresponding e-publication.

As used herein, the term "graphical object" refers to one or more images (e.g., photographs, illustrations, etc.), text (e.g., one or more words, characters, numbers, symbols, etc.), one or more graphics, animation content (e.g., Flash content), and/or any other suitable graphical content that may be included (e.g., displayed) within an e-reader interface and that may be representative of an e-publication, a segment of an e-publication, a category of e-publication content, an image from an e-publication, and/or any other suitable content associated with an e-publication. In some examples, a graphical object may include a thumbnail image, a title, an author, a number (e.g., a corresponding chapter or page number), and/or any other suitable content associated with a corresponding e-publication and/or e-publication segment. As will be explained in more detail below, a plurality of graphical objects may be arranged into one or more overlapping rows and/or columns.

In some examples, a graphical object may be associated with one or more display attributes. As used herein, the term "display attribute" may refer to any attribute associated with the display and/or visual appearance of a graphical object. Exemplary display attributes may include a shape of a graphical object, a size of a graphical object, a color of a graphical object, a position of a graphical object (e.g., a vertical position of the graphical object, a horizontal position of the graphical object, and/or a backward/forward position of the graphical object, whether within a display and/or relative to one or more other graphical objects), content (e.g., text, an image, etc.) included in the graphical object, and/or any other suitable display attribute associated with the graphical object. In some examples, a display attribute and/or alteration thereof may be configured to visually mark/distinguish a corresponding graphical object relative to one or more other graphical objects, as will be explained in more detail below. For example, at least one display attribute associated with a graphical object may be altered to bring the graphical object forward within a display and relative to one or more other graphical objects such that the graphical object stands out among and/or overlaps other graphical objects.

In some examples, a display attribute and/or an alteration thereof may be based on or otherwise associated with one or more attributes of a corresponding e-publication or e-publication segment (e.g., a genre, a topic, an author, a title, and/or any other suitable attribute associated with the e-publication and/or e-publication segment), a user profile associated with a user of an e-reader device (e.g., a user profile including information associated with the user's personal traits, preferences, settings, tendencies, ratings provided by the user, and/or any other suitable information associated with the user), one or more user interactions associated with the user of the e-reader device (e.g., one or more user interactions by the user with an e-reader interface, an e-publication, an e-publication segment, a graphical object, the e-reader device, etc.), and/or any other suitable information. To illustrate, graphical objects that are representative of e-publication segments that a user is likely to enjoy (e.g., based on user profile information, user interactions, and/or one or more corresponding attributes of the e-publication segments) may be more visually prominent (e.g., may be larger than, brighter than, positioned higher than, and/or overlap) than one or more other graphical objects displayed within an e-reader interface. Accordingly, a user may be presented with an e-publication interface that is personalized and/or customized for the user and/or configured to direct the user to e-publication content that is relevant to the user. Additionally or alternatively, each graphical object may have a unique appearance (e.g., a unique size, shape, color, etc.) compared to one or more other graphical objects. Accordingly, a group of graphical objects may include graphical objects of varying sizes, shapes, colors, and/or positions, as will be explained in more detail below.

Exemplary systems and methods will now be described in reference to the drawings.

FIG. 1 illustrates an exemplary e-reader interface management system 100 (or simply "system 100"). As will be described in more detail below, system 100 may be configured to provide, manage, control, and/or govern one or more e-reader interfaces.

System 100 may include, but is not limited to, a display facility 102, a detection facility 104, an interface management facility 106 (or simply "management facility 106"), and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

As will be described in more detail below, display facility 102 may be configured to direct an e-reader to display (e.g., by way of a display screen associated with the e-reader) a plurality of graphical objects representative of a plurality of corresponding segments of an e-publication. For example, display facility 102 may be configured to direct an e-reader to display a group of graphical objects each representative of an article, an advertisement, an image, or any other suitable content or segment associated with an e-magazine. As mentioned above, the displayed graphical objects may be arranged in any suitable manner, such as in a plurality of overlapping rows and/or columns. In some examples, the arrangement/organization of the graphical objects within the display may be predefined by a publisher, customized by a user, based on one or more categories associated with the corresponding segments of the e-publication, and/or configured in any other suitable manner. A user may interact with one or more of the graphical objects to access and/or experience (e.g., view, read, etc.) one or more corresponding segments of an e-publication. Accordingly, the graphical objects may form a graphical menu by way of which the user may browse and/or selectively access segments of an e-publication.

Detection facility 104 may be configured to detect that a user has accessed an e-publication segment. In some examples, detection facility 104 may be configured to detect a user interaction indicating that the user has accessed the e-publication segment. For example, detection facility 104 may detect a user interaction with a graphical object representative of an e-publication segment. To illustrate, a user may utilize a touch screen device to select (e.g., tap) a graphical object to access a corresponding e-publication segment, which user selection may be detected by detection facility 104. In additional or alternative examples, detection facility 104 may be configured to detect that the user has accessed an e-publication segment in any other suitable manner. For example, detection facility 104 may be configured to detect that a user has navigated to an e-publication segment from within an e-publication (e.g., from another e-publication segment within an e-publication). To illustrate, after finishing a particular article of an e-magazine, a user may access the next article in the e-magazine by navigating directly to the next article (e.g., by using one or more navigation options, such as a hyperlink option, a search option, a page turning option, etc.), which may be detected by detection facility 104.

Management facility 106 may be configured to provide, manage, govern, and/or otherwise control one or more e-reader interfaces. For example, management facility 106 may be configured to provide and/or manage an e-reader interface to be displayed by an e-reader device and configured to facilitate the discovery and/or access of e-publication content. In some examples, management facility 106 may be configured to dynamically alter one or more display attributes associated with one or more graphical objects. For example, management facility 106 may be configured to alter, in response to a detection by detection facility 104, at least one display attribute associated with a graphical object representative of an e-publication segment to visually indicate that the e-publication segment has been accessed by a user. To illustrate, management facility 106 may alter a position, shape, size, and/or color of a graphical object to visually distinguish the graphical object from one or more other graphical objects. In some examples, management facility 106 may be configured to bring a graphical object forward within a display to stand out among and/or overlap a plurality of other graphical objects, as will be explained in more detail below. In additional or alternative examples, management facility 106 may be configured to visually mark a graphical object in any other suitable manner.

Storage facility 108 may be configured to maintain e-publication data 110 representative of one or more e-publications and/or corresponding content and information. For example, e-publication data 110 may include data representative of an e-publication itself, data representative of content associated with an e-publication, data representative of a user's interactions with an e-publication, data representative of information associated with an e-publication, and/or any other suitable data associated with an e-publication. Storage facility 108 may be further configured to maintain graphical object data 112 representative of one or more graphical objects displayed by display facility 102. Storage facility 108 may be configured to maintain additional or alternative data as may serve a particular implementation.

Figure 2:
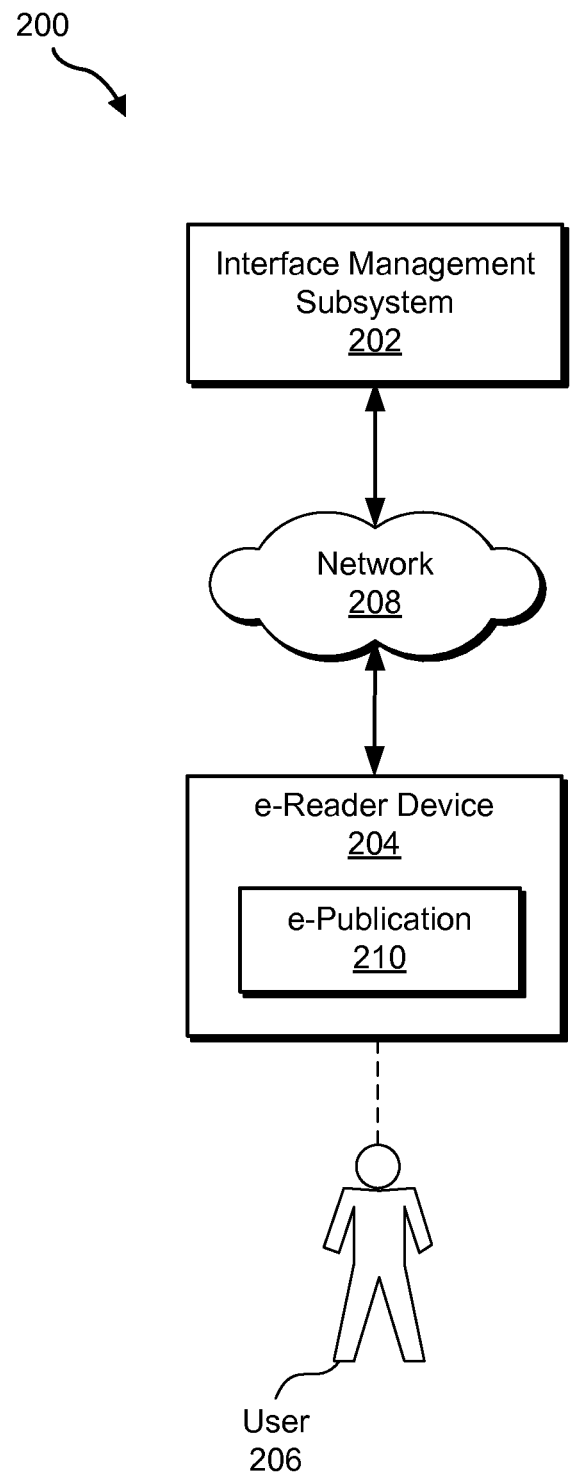
FIG. 2 illustrates an exemplary implementation of the system of FIG. 1 according to principles described herein.

FIG. 2 illustrates an exemplary implementation 200 of system 100 wherein an interface management subsystem 202 (or simply "management subsystem 202") is communicatively coupled to an e-reader device 204 associated with a user 206. As will be described in more detail below, display facility 102, detection facility 104, management facility 106, and storage facility 108 may each be implemented on one or both of management subsystem 202 and e-reader device 204.

Management subsystem 202 and e-reader device 204 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

In certain embodiments, management subsystem 202 and e-reader device 204 may communicate via a network 208, which may include one or more networks, including, but not limited to, wireless networks (Wi-Fi networks), wireless communication networks (e.g., 3G and 4G networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks capable of carrying data and/or communications signals between management subsystem 202 and e-reader device 204. Communications between management subsystem 202 and e-reader device 204 may be transported using any one of the above-listed networks, or any combination or sub-combination of the above-listed networks.

While FIG. 2 shows management subsystem 202 and e-reader device 204 communicatively coupled via network 208, it will be recognized that management subsystem 202 and e-reader device 204 may be configured to communicate one with another in any other suitable manner (e.g., via one or more direct connections).

As mentioned and as shown in FIG. 2, e-reader device 204 may be configured to maintain an e-publication 210 (e.g., in the form of data representative of the e-publication and/or remote access to data representative of the e-publication). Accordingly, user 206 may have access to and/or experience e-publication 210. In some examples, e-publication 210 may include a plurality of segments (e.g., chapters, articles, etc.). As will be explained in more detail below, e-reader device 204 may be configured to display an e-reader interface configured to facilitate interaction with, access to, and/or experiencing of e-publication 210 by user 206.

In certain embodiments, system 100 may be implemented entirely by or within management subsystem 202 or e-reader device 204. In other embodiments, components of system 100 may be distributed across management subsystem 202 and e-reader device 204. In some examples, e-reader device 204 may include a client (e.g., a client application) implementing one or more of the facilities of system 100.

Management subsystem 202 may be implemented by one or more computing devices. For example, management subsystem 202 may be implemented by one or more server devices. Additionally or alternatively, e-reader device 204 may be implemented by any suitable e-reader device, such as disclosed herein.

Figure 3:
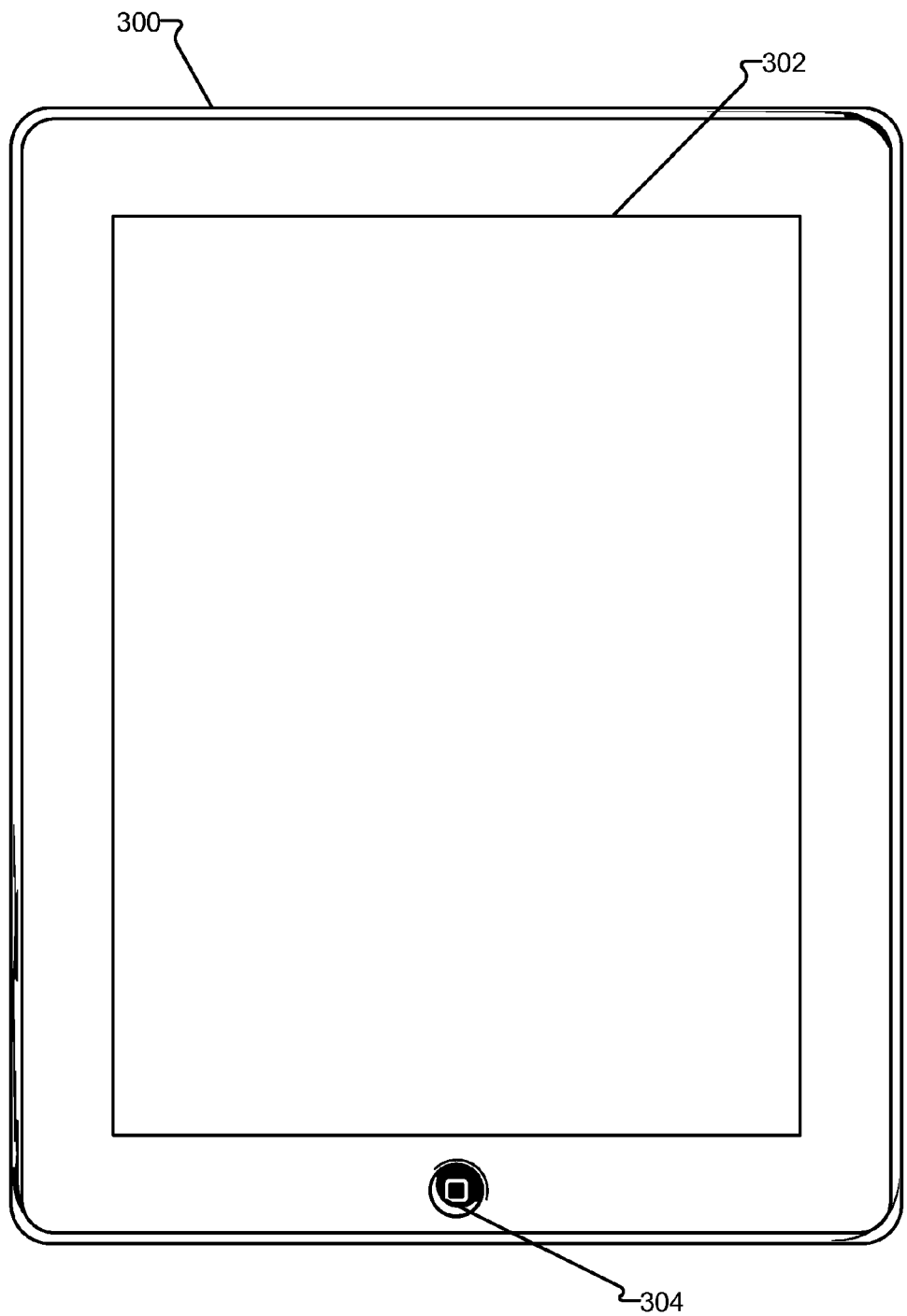
FIG. 3 illustrates an exemplary e-reader device according to principles described herein.

To illustrate, FIG. 3 shows an exemplary e-reader device 300 that may implement e-reader device 204. As shown, e-reader device 300 may include a display screen 302 and/or one or more input buttons (e.g., input button 304). In some examples, e-reader device 300 may be configured to present (e.g., display) text, images, and/or other content from an e-publication by way of display screen 302. Display screen 302 may be a touch screen by way of which a user may interact with an e-reader interface and/or e-publication displayed on display screen 302. For example, a user may utilize display screen 302 to provide one or more touch gestures associated with one or more corresponding operations. Input button 304 may be configured to allow a user to further interact with e-reader device 300, an e-reader interface, and/or an e-publication. For example, input button 304 may be configured to allow a user to operate e-reader device 300, select one or more options associated with an e-reader interface displayed on display screen 302, and/or perform any other suitable operation associated with e-reader device 300.

E-reader device 300 is provided for illustrative purposes only and is not limiting. In additional or alternative examples, the systems and methods disclosed herein may be implemented by and/or performed in accordance with any other suitable e-reader device, as may serve a particular implementation.

Figure 4:
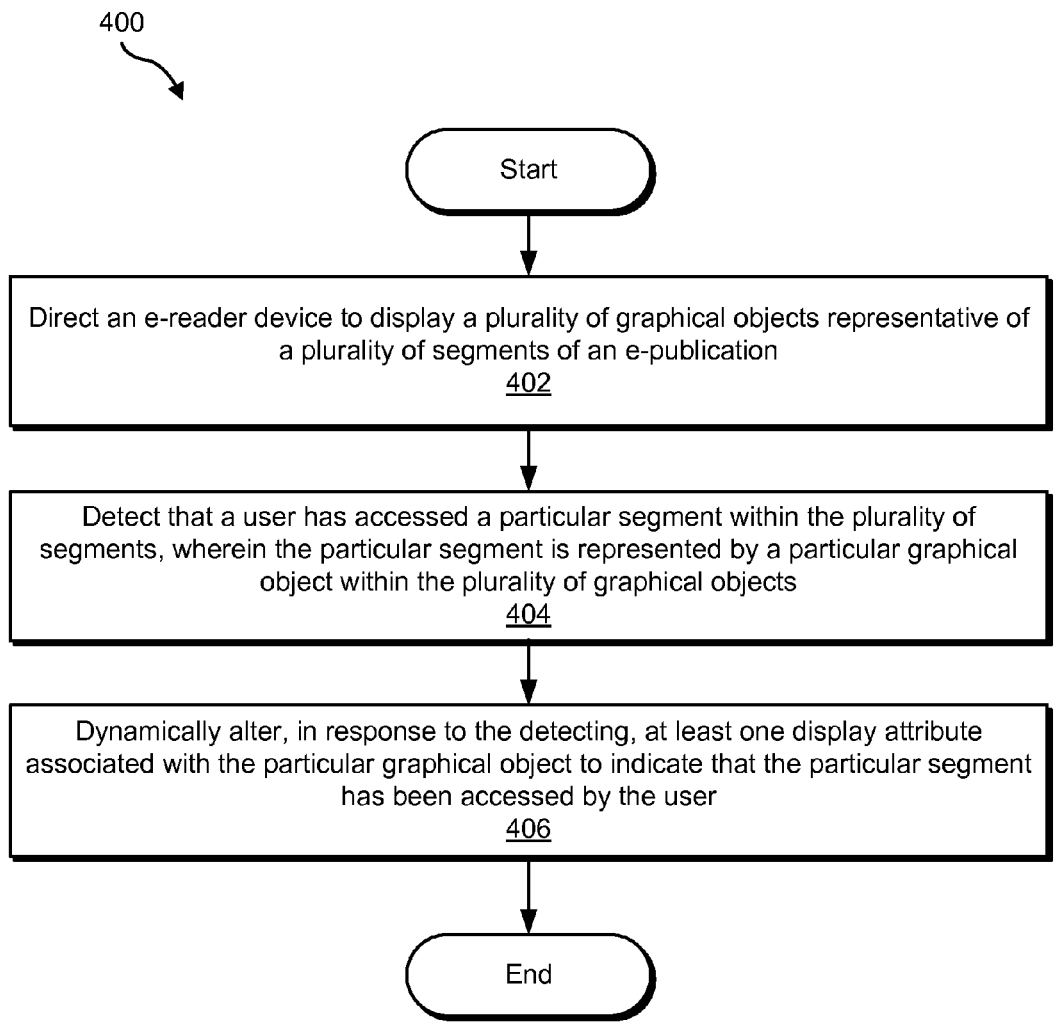
FIG. 4 illustrates an exemplary method of managing an e-reader interface according to principles described herein.

FIG. 4 illustrates an exemplary method 400 of managing an e-reader interface. While FIG. 4 illustrates exemplary steps according to one embodiment, other embodiments may omit, add to, reorder, and/or modify any of the steps shown in FIG. 4. One or more of the steps shown in FIG. 4 may be performed by any component or combination of components of system 100, interface management subsystem 202, and/or e-Reader device 204.

In step 402, an e-reader device is directed to display a plurality of graphical objects representative of a plurality of segments of an e-publication. In some examples, the plurality of graphical objects may be arranged into a plurality of overlapping rows. Display facility 102 may be configured to direct an e-reader device (e.g., e-reader device 300) to display the graphical objects in any suitable manner, such as disclosed herein.

Figure 5:
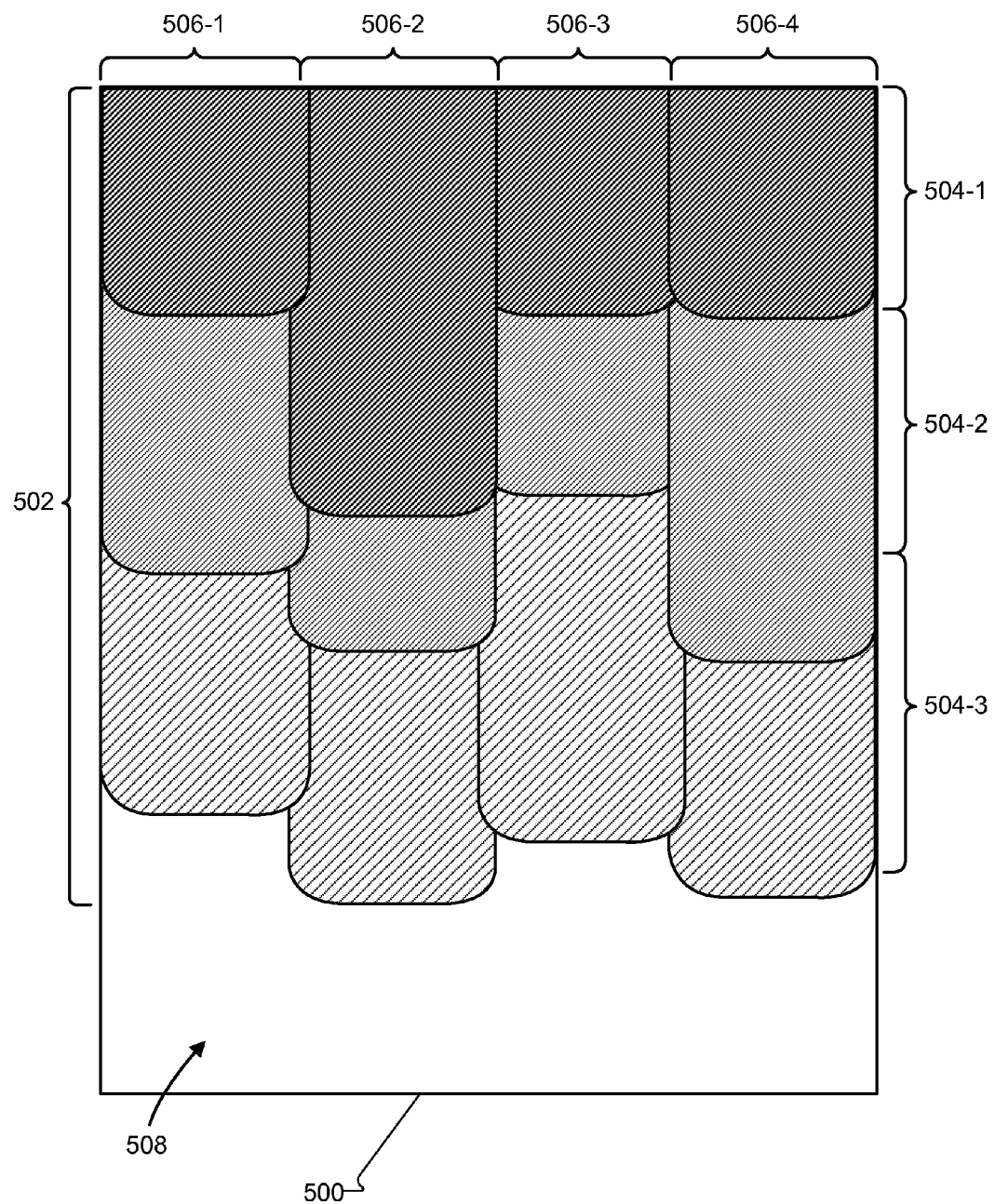
FIGS. 5-8 illustrate exemplary views of one or more exemplary e-reader interfaces according to principles described herein.

To illustrate, FIG. 5 shows a view of an exemplary e-reader interface 500 (or simply "interface 500") that may be provided, managed, and/or controlled by system 100 and/or displayed by way of an e-reader device (e.g., e-reader device 300). As shown in FIG. 5, display facility 102 may direct the e-reader device to display a plurality of graphical objects 502 within interface 500. In some examples, each of graphical objects 502 may be representative of a segment of an e-publication. For example, each of graphical objects 502 may be representative of an article included in an e-magazine.

As further shown in FIG. 5, graphical objects 502 may be arranged into one or more rows 504-1 through 504-3 (collectively referred to herein as "rows 504") and/or one or more columns 506-1 through 506-4 (collectively referred to herein as "columns 506"). In some examples, a row 504 may overlap one or more adjacent rows 504 and/or a column 506 may overlap one or more adjacent columns 506. Although FIG. 5 shows twelve graphical objects 502 arranged into three rows 504 and four columns 506, one will appreciate that interface 500 may be modified to include any other suitable number (e.g., more or less) graphical objects arranged into any other suitable number of rows and/or columns.

The arrangement of graphical objects 502 within interface 500 may be configured in any suitable manner as may serve a particular implementation. For example, the arrangement of graphical objects 504 may be predefined by a publisher/provider of the corresponding e-publication, may be customized by a user, may be dynamically managed and/or modified by management facility 106 (e.g., in response to user interactions and/or changing user preferences, traits, moods, etc.), and/or may be configured in any other suitable manner.

In some examples, one or more of rows 504 and/or columns 506 may be associated with a defined group of graphical objects 502 and/or corresponding e-publication content. Additionally or alternatively, one or more rows 504 and/or columns 506 may represent a hierarchy and/or ranking of corresponding e-publication content. For example, row 504-1 may represent primary content, row 504-2 may represent secondary content, and/or row 504-3 may represent tertiary content. To illustrate, a publisher may designate one or more graphical objects 502 that the publisher considers to be most important (e.g., representative of the most important segments of the e-publication) for inclusion in row 504-1, designate one or more graphical objects 502 that the publisher considers to be of secondary importance for inclusion in row 504-2, and/or designate one or more graphical objects 502 that the publisher considers to be least important for inclusion in row 504-3. Additionally or alternatively, management facility 106 may be configured to dynamically include one or more graphical objects 502 that management facility 106 determines to be most relevant to a user in row 504-1, include one or more graphical objects 502 that management facility 106 determines to be of secondary relevance to the user in row 504-2, and/or include one or more graphical objects 502 that management facility 106 determines to be least relevant to the user in row 504-3. In certain implementations, a user may selectively modify, customize, and/or otherwise control the distribution of graphical objects 502 among rows 504, columns 506, and/or interface 500.

In additional or alternative examples, one or more of rows 504 and/or columns 506 may be associated with a particular category of e-publication content. For example, one or more of rows 504 and/or columns may be associated with and/or include graphical objects 502 associated with a particular genre of e-publication content (e.g., humor, fiction, news, etc.), a particular topic of e-publication content (e.g., politics, entertainment, sports, etc.), a particular person or organization (e.g., an author, a publisher, a photographer, etc.), a particular rating (e.g., a user rating, a critics rating, etc.), a particular type of e-publication content (e.g., text, image, video, etc.), and/or any other suitable category of e-publication content.

As mentioned above and as shown in FIG. 5, each of graphical objects 502 may be visually unique in one or more ways when compared to one or more other graphical objects 502. For example, graphical objects 502 may have varying sizes, shapes, colors, and/or positions. In some examples, the size, shape, color, and/or position of a particular graphical object 502 may be based on any suitable information associated with a user (e.g., information associated with a user profile, one or more user interactions with one or more e-publication segments, one or more user ratings, etc.) and/or a corresponding e-publication segment (e.g., information associated with one or more attributes of the e-publication segment). Accordingly, the size, shape, color, and/or position of the particular graphical object 502 may be configured to visually indicate information associated with the e-publication segment and/or a relevance of the e-publication segment to the user. To illustrate, a size (e.g., a length and/or width) of the particular graphical object 502 may be configured to visually indicate how likely the user is to enjoy the corresponding e-publication segment, a color of the particular graphical object 502 may be configured to visually indicate a topic of the corresponding e-publication segment, and/or a shape of the particular graphical object 502 may be configured to visually indicate a type of content associated with the e-publication segment. In additional or alternative examples, the visual appearance of graphical objects 502 may be configured in any other suitable manner and/or may be indicative of any other suitable information.

As further shown, graphical objects 502 may have a configuration and/or design that is similar to one or more tabs or petals (e.g., flower petals). For example, graphical objects 502 may be displayed in accordance with a design that simulates a series of layers of tabs and/or petals. One will appreciate, however, that graphical objects 502 may be additionally and/or alternatively displayed in accordance with any other suitable design/configuration.

In additional or alternative examples, interface 500 may include a background 508, as shown in FIG. 5. In some examples, display facility 102 may direct the e-reader device to display one or more graphics (e.g., in accordance with one or more corresponding themes), one or more advertisements (e.g., advertisements specifically targeted to a user and/or associated with e-publication content represented by graphical objects 502), and/or any other any other suitable images, options, and/or information within background 508.

Returning to FIG. 4, in step 404, it may be detected that a user has accessed a particular segment within the plurality of segments. In some examples, the particular segment may be represented by a particular graphical object within the plurality of graphical objects. Detection facility 104 may be configured to detect that the user has accessed the particular segment in any suitable manner, such as disclosed herein.

Figure 6:
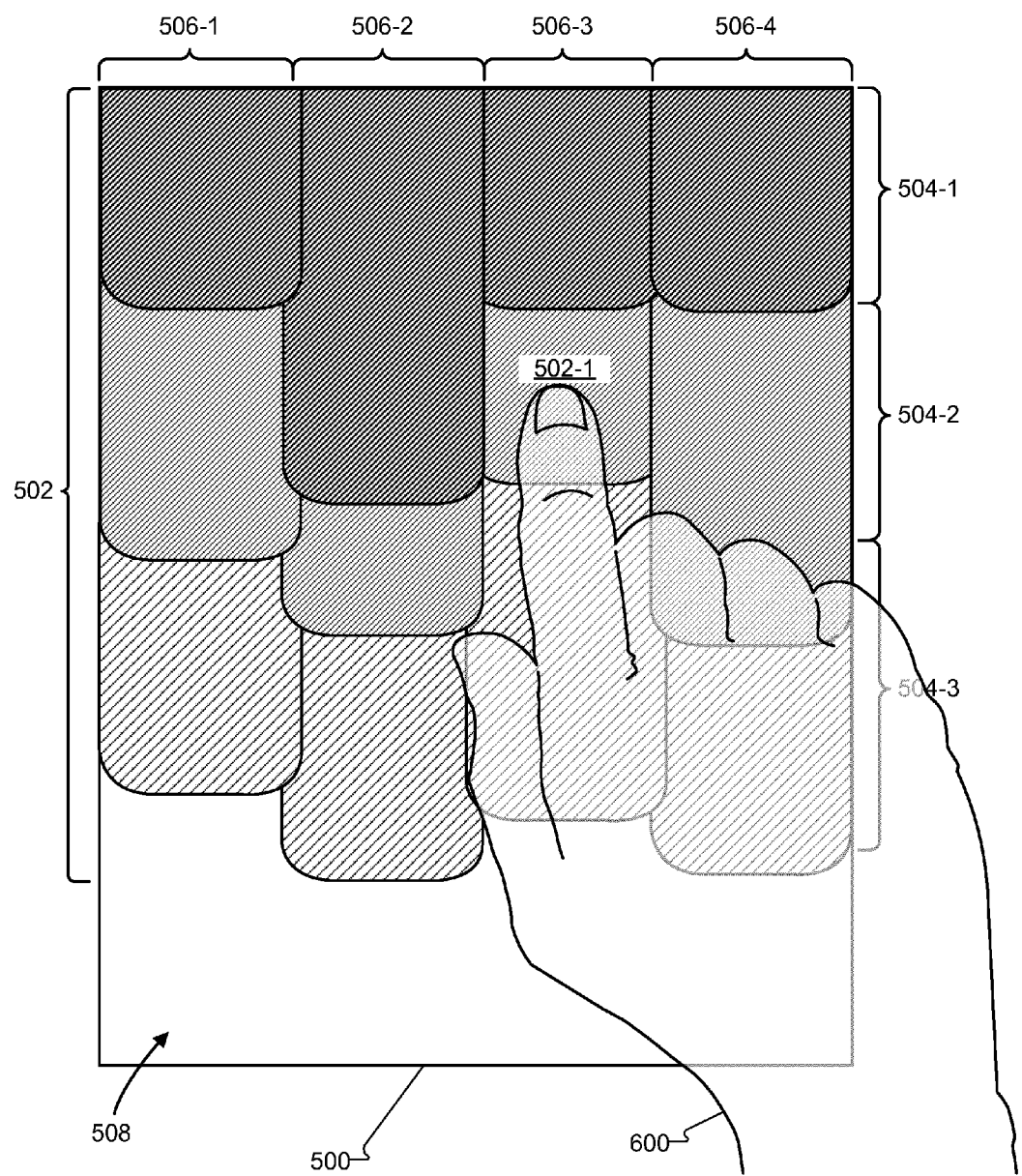

To illustrate, FIG. 6 includes another view of interface 500. As shown in FIG. 6, a user 600 may utilize interface 500 to select (e.g., tap) a particular graphical object 502-1 to access a corresponding e-publication segment (e.g., a corresponding article). In response to the user selection, the e-reader device may display and/or allow user 600 to otherwise access and/or experience the corresponding e-publication segment. Detection facility 104 may be configured to detect the selection by user 600 and/or detect that user 600 accessed the corresponding e-publication segment in any suitable manner, such as disclosed herein.

Returning to FIG. 4, in step 406, in response to the detecting, at least one display attribute associated with the particular graphical object may be altered to visually indicate that the particular segment has been accessed by the user. For example, management facility 106 may be configured to dynamically alter any suitable display attribute associated with the graphical in any suitable manner, such as disclosed herein.

Figure 7:
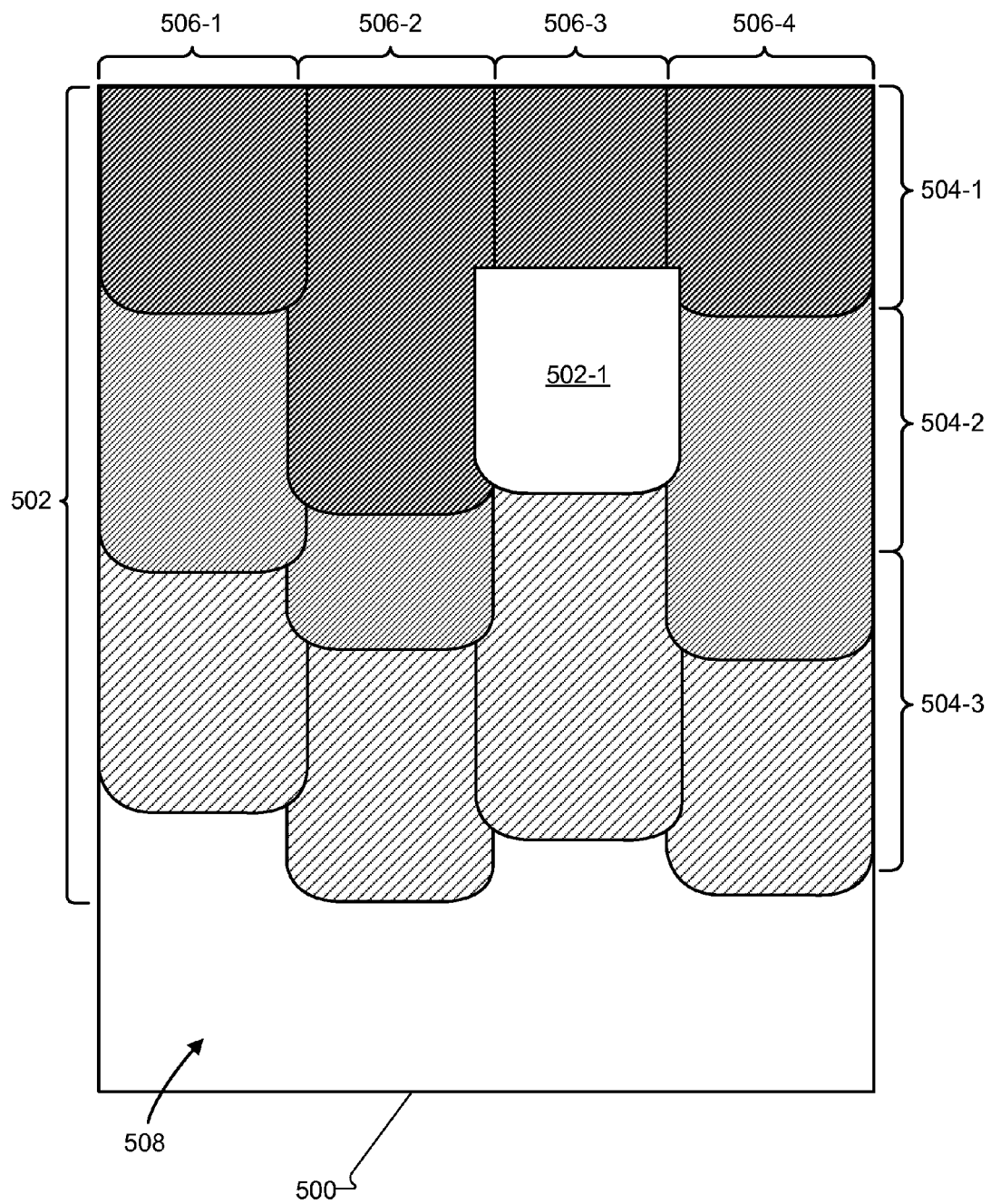

To illustrate, FIG. 7 shows a view of interface 500 after user 600 has accessed the e-publication segment represented by graphical object 502-1. As shown, in response to a detection by detection facility 104, management facility 106 may dynamically alter a visual appearance of graphical object 502-1 to visually indicate that user 600 accessed the e-publication segment represented by graphical object 502-1. For example, management facility 106 may be configured to alter a position of graphical object 502-1 relative to one or more other graphical objects 502 to bring graphical object 502-1 forward within the display such that graphical object 502-1 stands out relative to and/or overlaps one or more other graphical objects 502 (e.g., one or more other graphical objects that previously overlapped graphical object 502-1). Management facility 106 may be configured to additionally or alternatively alter any other suitable display attribute associated with graphical object 502-1 to visually distinguish graphical object 502-1 relative to one or more other graphical objects 502. For example, management facility 106 may be configured to highlight graphical object 502-1. Accordingly, whenever user 600 returns to interface 500 (e.g., after experiencing the e-publication segment, after exiting and re-entering the e-publication, after turning the e-reader device off and then back on, etc.), user 600 can visually determine what segments of the e-publication user 600 has previously accessed.

Figure 8:
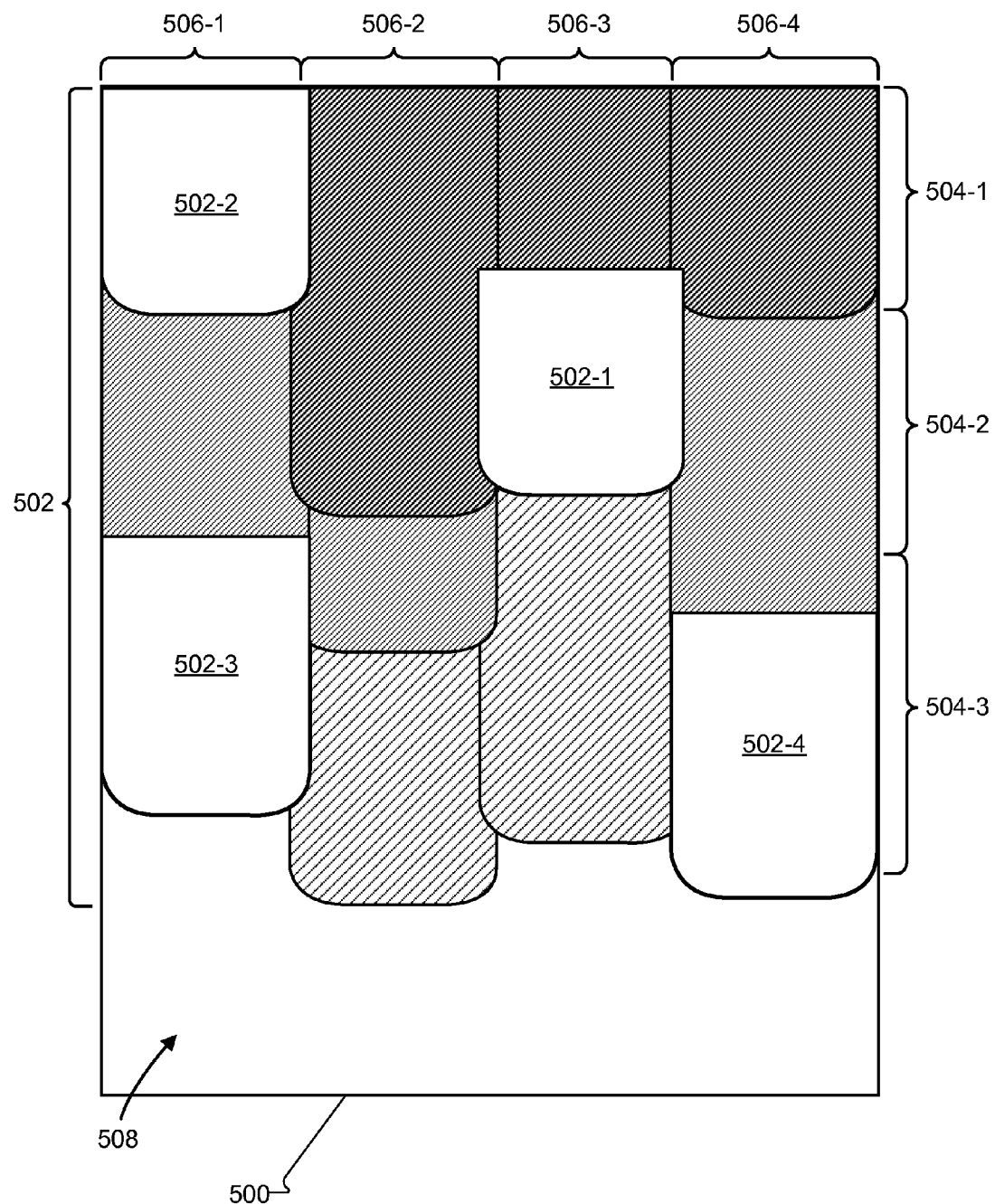

In certain implementations, management facility 106 may be configured to dynamically alter the visual appearance of a plurality of graphical objects 502 to visually indicate that corresponding e-publication segments have been accessed by user 600. To illustrate, FIG. 8 shows a view of interface 500 after user 600 has additionally accessed a number of other segments of the e-publication. For example, as shown in FIG. 8, management facility 106 has altered the visual appearances of graphical objects 504-2, 504-3, and 504-4 to visually indicate that user 600 has accessed the e-publication segments represented by graphical objects 504-2, 504-3, and 504-4. In some examples, management facility 106 may be configured to dynamically alter at least one display attribute associated with each of graphical objects 504-2, 504-3, and 504-4 in any suitable manner, such as disclosed herein. Accordingly, a user may be informed of which segment(s) of the e-publication he/she has accessed and which segment(s) he/she has yet to access.

Management facility 106 may be additionally or alternatively configured to indicate an order or frequency associated with the access of the e-publication segments. For example, management facility 106 may label each of graphical objects 504-1, 504-2, 504-3, and 504-4 with information representative of the order in which user 600 accessed the corresponding e-publication segments, how many times user 600 has accessed each of the corresponding e-publication segments, and/or timestamps associated with when user 600 accessed each of the corresponding e-publication segments.

In additional or alternative examples, system 100 may be self-learning over time and may be configured to dynamically adjust a user's e-publication experience in accordance with the user's changing preferences, traits, and/or moods. For example, system 100 may be configured to track what e-publication segments a user accesses, how often the user accesses certain e-publication segments, what types of e-publication segments the user accesses, and/or any other suitable information and then dynamically alter a visual appearance of one or more other graphical objects representative of one or more other e-publication segments (e.g., one or more e-publication segments that the user has not accessed yet, whether from the same or a different e-publication) to reflect any changes in the user's preferences and/or tendencies. Accordingly, system 100 may be configured to provide an e-reader interface that dynamically adapts to the user's behavior in a personalized and/or customized manner. To illustrate the foregoing, system 100 may be configured to track a user's interactions with a particular issue of an e-magazine to determine the user's preferences, tendencies, and/or reading patterns and then dynamically adjust an e-reader interface associated with a subsequent issue of the e-magazine in accordance with the obtained information so that corresponding e-publication content is presented to the user in accordance with the user's preferences, tendencies, and/or reading patterns, thereby providing an appealing and/or intuitive e-publication experience to the user. For example, based on the user's interactions with the previous issue of the e-magazine, system 100 may determine that the user prefers to read articles by a particular author and/or a jokes section of the e-magazine before experiencing other portions of the e-magazine. Based on this determination, in the e-reader interface associated with the subsequent issue of the e-magazine, system 100 may display graphical objects representative of articles by the particular author and/or a jokes section within a row of primary content, having a size that is larger than one or more other graphical objects, overlapping one or more other graphical objects, and/or being visually marked in any other suitable manner, such as disclosed herein.

FIGS. 5-8 are provided for illustrative purposes only and are not limiting. One will appreciate that in additional or alternative examples, one or more elements of interface 500 may be modified, added to, and/or redacted in any suitable manner.

Figure 9:
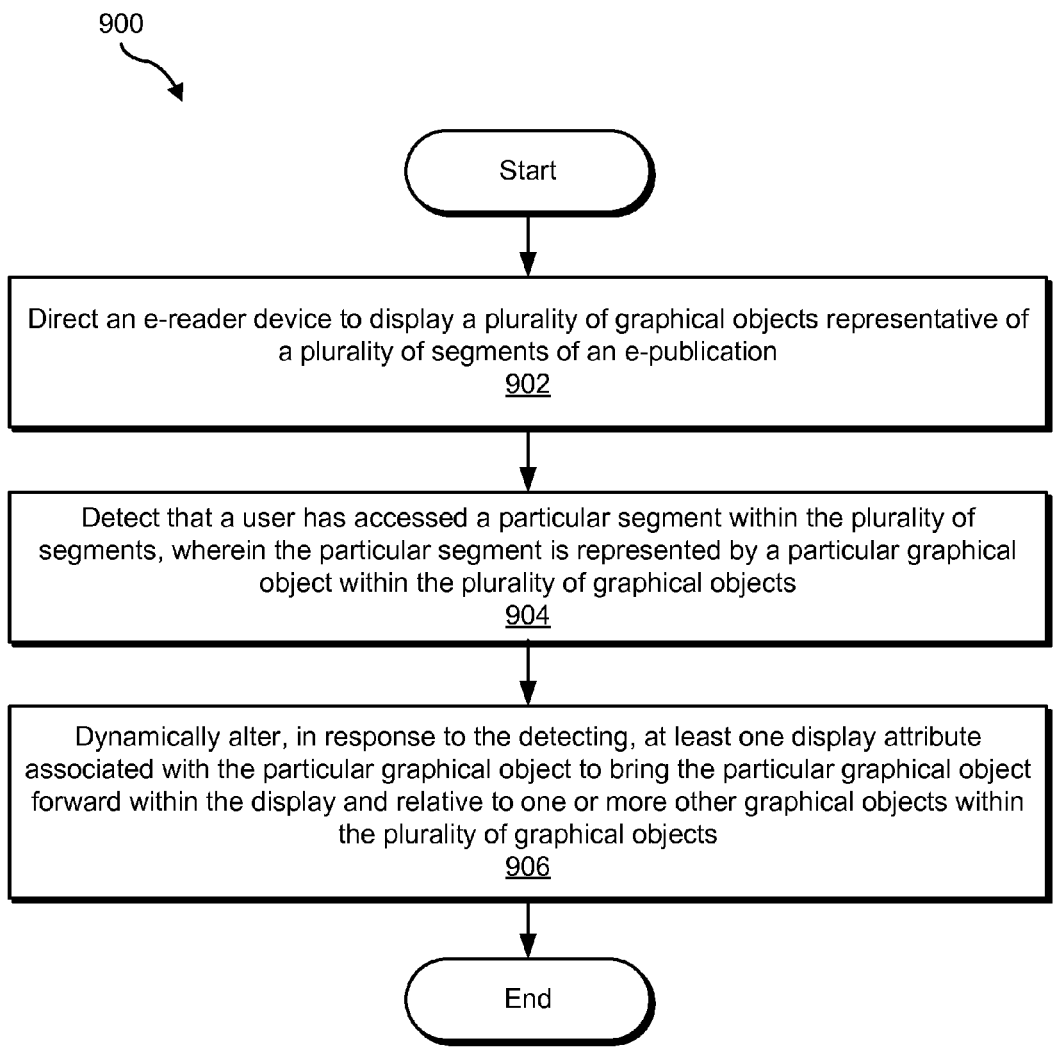
FIG. 9 illustrates another exemplary method of managing an e-reader interface according to principles described herein.

FIG. 9 illustrates another exemplary method 900 of managing an e-reader interface. While FIG. 9 illustrates exemplary steps according to one embodiment, other embodiments may omit, add to, reorder, and/or modify any of the steps shown in FIG. 9. One or more of the steps shown in FIG. 9 may be performed by any component or combination of components of system 100, interface management subsystem 202, and/or e-Reader device 204.

In step 902, an e-reader device is directed to display a plurality of graphical objects representative of a plurality of segments of an e-publication. For example, display facility 102 may be configured to direct an e-reader device (e.g., e-reader device 300) to display the graphical objects in any suitable manner, such as disclosed herein.

In step 904, it may be detected that a user has accessed a particular segment within the plurality of segments. In some examples, the particular segment may be represented by a particular graphical object within the plurality of graphical objects. Detection facility 104 may be configured to detect that the user has accessed the particular segment in any suitable manner, such as disclosed herein.

In step 906, in response to the detecting, at least one display attribute associated with the particular graphical object may be dynamically altered to bring the particular graphical object forward within the display and relative to one or more other graphical objects within the plurality of graphical objects. For example, management facility 106 may be configured to dynamically alter any suitable display attribute associated with the graphical object in any suitable manner to bring the graphical object forward within the display and relative to one or more other graphical objects within the plurality of graphical objects, such as disclosed herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
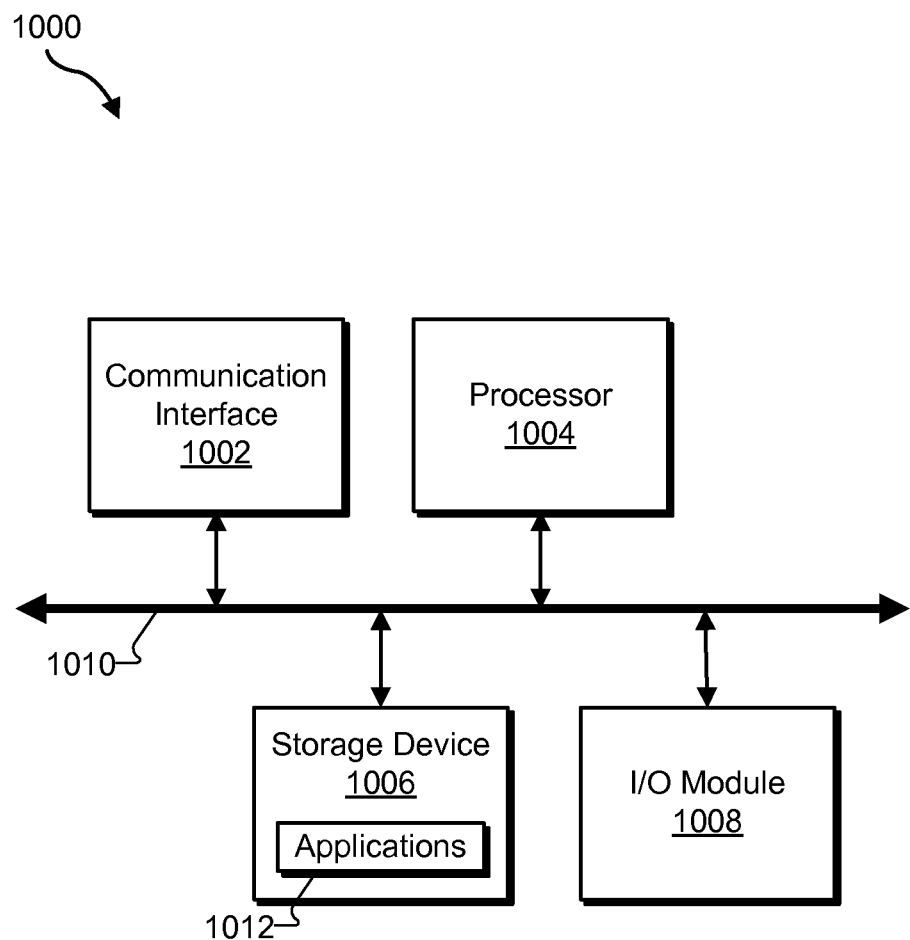
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1006 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. In at least one embodiment, communication interface 1002 may provide a direct connection between system 100 and one or more provisioning systems via a direct link to a network, such as the Internet. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1006 may be configured to receive user input and provide user output and may include any hardware, firmware, software, or combination thereof supportive of input and output capabilities. For example, I/O module 1006 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1006 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1006 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with display facility 102, detection facility 104, and/or management facility 106. Likewise, storage facility 108 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   directing, by an e-reader interface management system, an e-reader device to display a plurality of graphical objects representative of a plurality of segments of an e-publication, wherein the graphical objects are arranged in a plurality of overlapping rows each comprising one or more of the graphical objects;
   detecting, by the e-reader interface management system, that a user has accessed a particular segment within the plurality of segments, wherein the particular segment is represented by a particular graphical object within the plurality of graphical objects; and dynamically altering, by the e-reader interface management system in response to the detecting, at least one display attribute of the particular graphical object to indicate that the particular segment has been previously accessed by the user.

2. The method of claim 1, wherein at least one of the plurality of overlapping rows is associated with a particular category associated with one or more of the plurality of segments of the e-publication.

3. The method of claim 1, wherein the graphical objects are arranged in accordance with one or more predefined parameters specified by a publisher associated with the e-publication.

4. The method of claim 1, wherein the graphical objects are arranged in accordance with one or more custom parameters specified by the user.

5. The method of claim 1, wherein the at least one display attribute comprises at least one of a size, a shape, and a color of the particular graphical object.

6. The method of claim 1, wherein the detecting that a user has accessed the particular segment comprises detecting a user selection of the particular graphical object.

7. The method of claim 1, wherein the dynamic altering of the at least one display attribute is configured to visually distinguish the particular graphical object relative to one or more other graphical objects within the plurality of graphical objects.

8. The method of claim 1, wherein the dynamic altering of the at least one display attribute is configured to bring the particular graphical object forward within the display and relative to one or more other graphical objects within the plurality of graphical objects.

9. The method of claim 1, wherein the graphical objects are further arranged into a plurality of columns.

10. The method of claim 1, wherein:
    the e-publication comprises an e-magazine, and
    the plurality of segments comprise one or more articles included in the e-magazine.

11. The method of claim 1, wherein a size associated with at least one graphical object within the plurality of graphical objects and representative of at least one segment within the plurality of segments is configured to indicate a relevance of the at least one segment to the user.

12. The method of claim 1, further comprising altering, by the e-reader interface management system in accordance with access to the particular segment, at least one display attribute associated with at least one other graphical object.

13. The method of claim 12, wherein the at least one other graphical object is included within the plurality of graphical objects.

14. The method of claim 12, wherein the at least one other graphical object is representative of at least one other segment of at least one other e-publication.

15. The method of claim 1, embodied as computer-executable instructions on at least one non-transitory computer-readable medium.

16. currently amended) A method comprising:
    directing, by an e-reader interface management system, an e-reader device to display a plurality of overlapping graphical objects representative of a plurality of segments of an e-publication;
    detecting, by the e-reader interface management system, that a user has accessed a particular segment within the plurality of segments, wherein the particular segment is represented by a particular graphical object within the plurality of graphical objects; and
    dynamically altering, by the e-reader interface management system in response to the detecting, at least one display attribute of the particular graphical object to indicate that the particular segment has been previously accessed by the user by bringing the particular graphical object forward within the display and relative to one or more other graphical objects within the plurality of graphical objects.

17. The method of claim 16, wherein the plurality of overlapping graphical objects are arranged in a plurality of overlapping rows.

18. The method of claim 16, further comprising dynamically altering, by the e-reader interface management system in response to the detecting, at least one of a size, a shape, and a color of the particular graphical object.

19. The method of claim 16, embodied as computer-executable instructions on at least one non-transitory computer-readable medium.

20. A system comprising:
    at least one computing device that comprises
        a display facility configured to direct an e-reader device to display a plurality of graphical objects arranged in a plurality of overlapping rows and representative of a plurality of segments of an e-publication;
        a detection facility communicatively coupled to the display facility and configured to detect that a user has accessed a particular segment within the plurality of segments, wherein the particular segment corresponds to a particular graphical object within the plurality of graphical objects; and
        an e-reader interface management facility communicatively coupled to the detection facility and configured to dynamically alter at least one display attribute of the particular graphical object to indicate that the particular segment has been previously accessed by the user.

* * * * *